United States Patent Office 3,581,330
Patented June 1, 1971

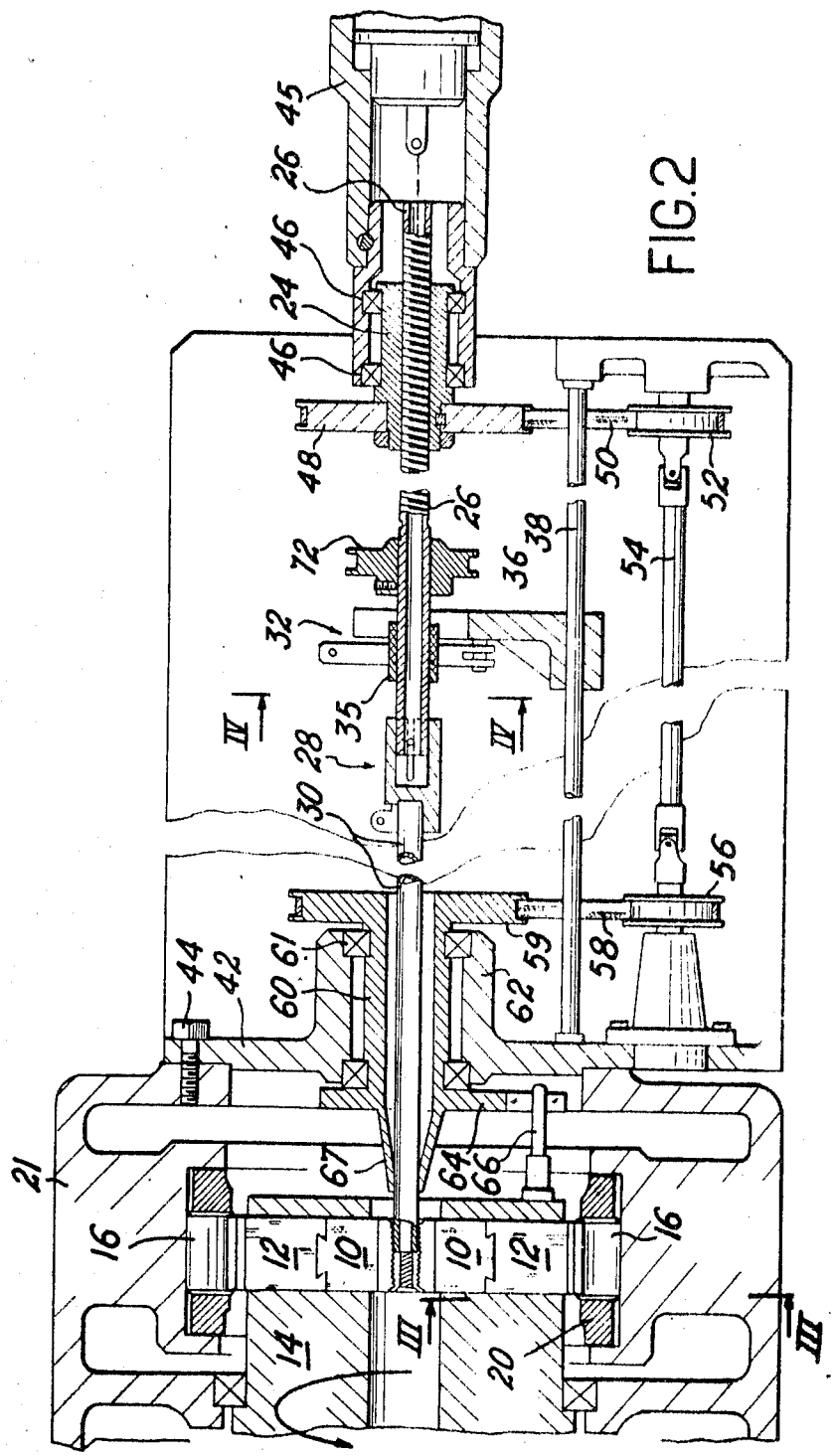

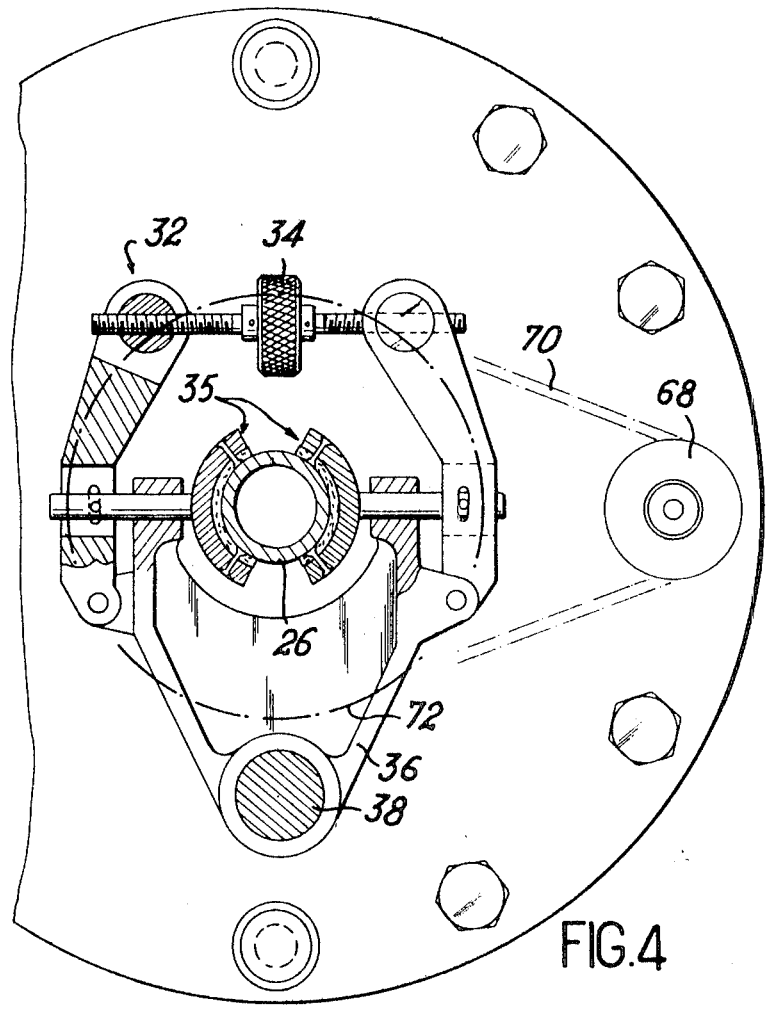
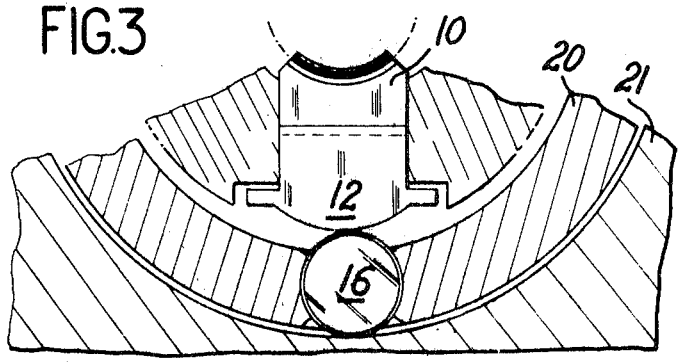

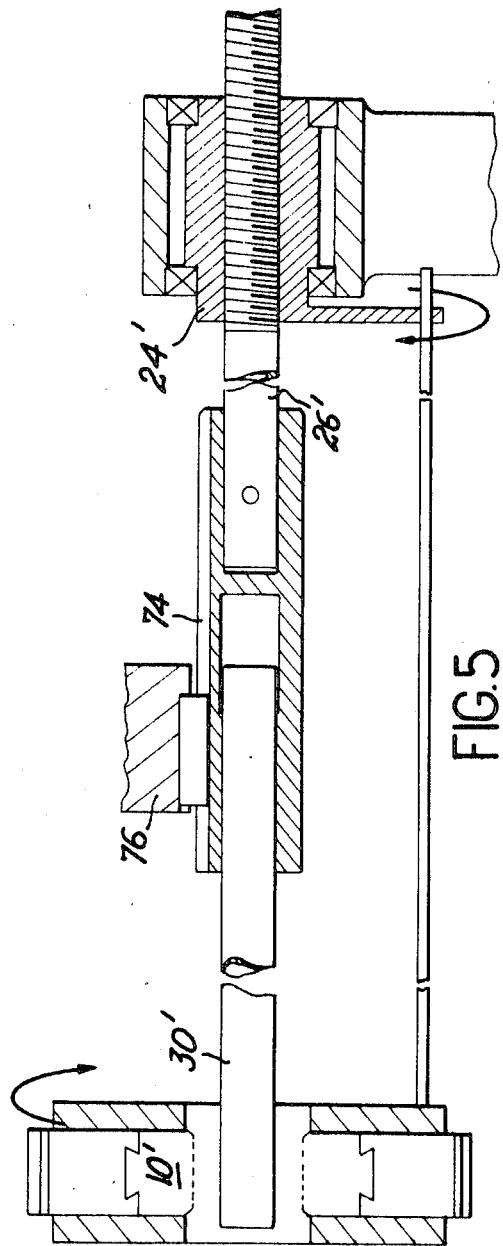

3,581,330
METHOD AND APPARATUS FOR FORMING THREADS BY RECIPROCATING HAMMERS
Yvan Ortel, Fontenay-aux-Roses, France, assignor to Commissariat a l'Energie Atomique, Paris, France
Filed Dec. 19, 1968, Ser. No. 785,129
Claims priority, application France, Dec. 28, 1967, 133,979
Int. Cl. B23g 7/00; B21h 3/02; B21k 1/56
U.S. Cl. 10—153
11 Claims

ABSTRACT OF THE DISCLOSURE

For forming screw-threads on the outer surface of a cylindrical rod by block jaws provided with an impression of the screw-thread to be formed and adapted to rotate as a single unit about an axis while being endowed with a simultaneous radial reciprocating movement towards and away from said axis, one of the components of a threaded coupling unit having a pitch equal to that of the screw-thread to be formed is driven in rotation about said axis in synchronism with said hammer-block jaws, the workpiece to be threaded is coupled to the second component of said coupling unit and said workpiece is caused to rotate with respect to said hammer-block jaws by being either driven or retained according to thread-forming requirements.

---

This invention is directed to a method of forming screw-threads on the outer cylindrical surfaces of rods or tubes as well as to a device for carrying out said method. The term "screw-thread" will be understood to mean any thread form consisting of a continuous helical projection, rib or groove or a plurality of surface elevations of this type which are placed at equal angular intervals.

It is already a known practice to form coarse screw-threads on internal tube-surfaces as a result of swaging produced by means of hammer blows. The main application of this method consists in the manufacture of rifled bores for small arms in which the blanks employed are smooth-walled tubes. The principle of this manufacturing process as well as the machines employed for carrying out the process are well known. Machines of this type comprise a plurality of smooth rotating hammer-block jaws (usually four in number) which close and open at high frequency under the action of a drive mechanism. The tubular blank is inserted between the hammer-block jaws which compress the metal, reduce the diameter of the blank to the desired value by swaging, then impress the blank on a mandrel or plug of small length which is maintained at the level of the jaws and freely mounted in rotation. The mandrel is provided with surface elevations which, during the hammering action, produce depressions in the steel of the blank in order to form the thread grooves. The mandrel may be only slightly greater in length than the axial length of the jaws and is guided as it rotates along that portion of the grooves which has already been formed. The external surface of the blank remains smooth. The machines which are ordinarily employed for manufacturing parts of this type usually operate at a rate of 3 to 10 compressions per revolution of the component which carries the jaws; the speed of rotation of said component about its axis is usually comprised between 50 and 500 revolutions per minute and the compression force can be substantially in excess of 100 tons.

This method of swaging by compression carries a large number of advantages, especially high production speed, the fact that there is no loss of metal in the form of shavings, increased hardness and excellent finish. However, the use of the method up to the present time has been limited to the formation of coarse threads on the internal faces of tubes (in order to permit the advance of the mandrel). This method was considered wholly unsuited for forming screw-threads in the external cylindrical surfaces of tubes or rods. Indeed, the problem in this case is a wholly different one: the hammer-block jaws can no longer be smooth since the crest and root of the external screw-thread are intended to be reproduced by the jaws themselves. The cylindrical blank to be threaded must be capable both of moving through the jaws, of rotating with the jaws when they are closed and of taking up a suitable position at the time of closure. No satisfactory solution to this problem has been found up to the present time except in cases where a rough-formed thread is acceptable and the workpiece is of small length.

The present invention is directed to the basic concept of a method of forming external screw-threads on rods or tubes by the action of hammer blows so that the internal surfaces of said rods or tubes can either remain smooth and cylindrical or be grooved in accordance with conventional methods, said method being intended to retain the advantages of existing applications of swaging by hammer blows.

One mode of execution of the invention and an alternate form thereof will now be described by way of non-limitative example, reference being made to the accompanying drawings, in which:

FIG. 2 is a highly simplified longitudinal sectional view of a device corresponding to the diagram of FIG. 1;

FIGS. 3 and 4 are sectional views taken along the lines III—III and IV—IV of FIG. 2;

FIG. 5 is a detail view showing an alternative form of construction of the device.

Figure 1:
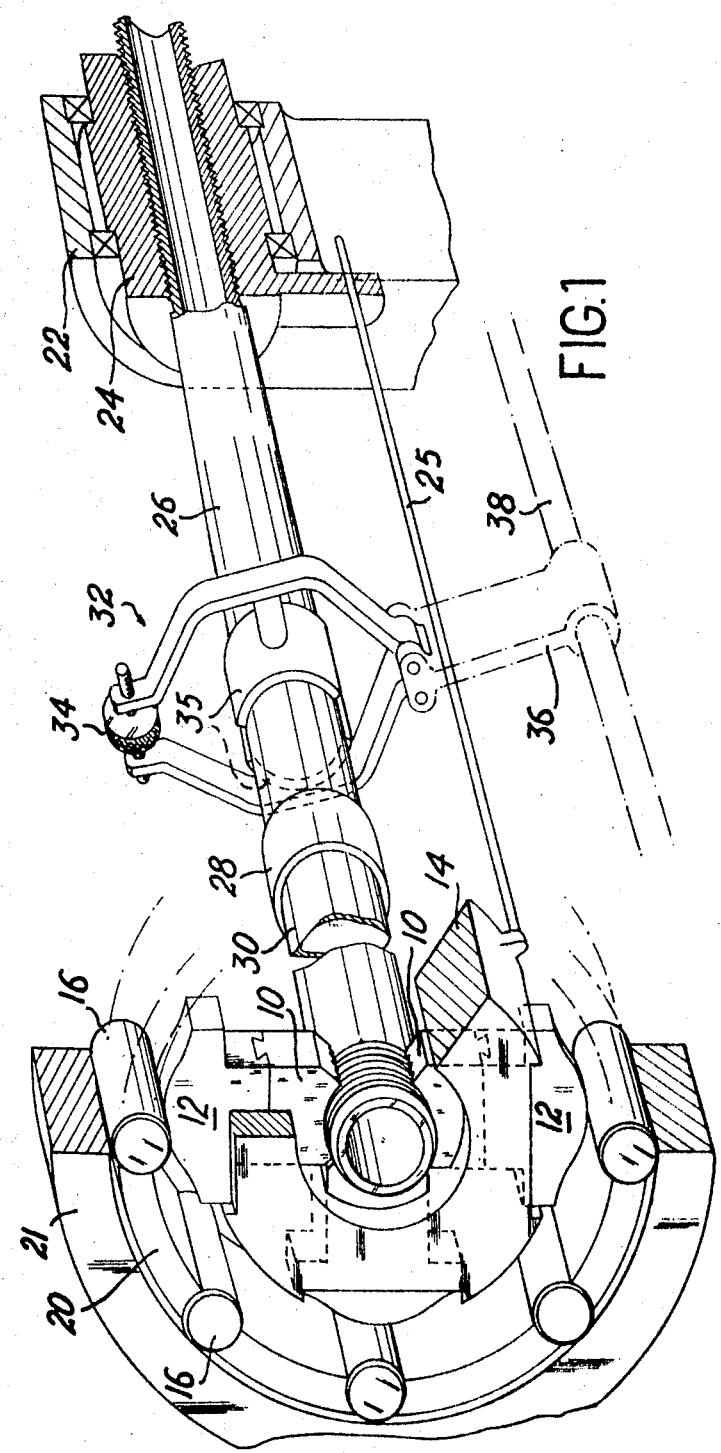
FIG. 1 is a very diagrammatic view in perspective showing the arrangement of the main components of a device in accordance with the invention.

FIG. 1 shows the portions of a rotary swaging machine of conventional type which have been modified in the device according to the invention as well as the components which are directly associated therewith. Four jaws 10 are carried by hammer-blocks 12 which are slidably mounted in the radial direction in the terminal annular portion of the spindle 14: the displacement of the jaws towards the axis is controlled by means of rollers 16 which are adapted to run on a high-strength stationary outer ring 21, the diameter of said rollers being such that these latter apply thrust on the hammer-blocks at the time of rotation of the spindle. Said rollers 16 are carried by a freely rotatable annular cage or separator ring 20.

The screw-thread to be obtained is reproduced as a surface depression or helical groove by means of the jaws of the device according to the invention. It is important to note that said screw-thread can have any desired pitch and can comprise one or a number of threads whereas the internal screw-threads which were formed by hammering in accordance with prior art methods could only have a coarse pitch (of substantial length relative to the internal diameter of the workpiece).

A fixed point 22 of the machine is intended to retain a sleeve 24 in the axial direction while permitting freedom of rotation of this latter. Said sleeve 24 is provided with an internal thread which is coaxial with the thread to be formed, is of equal pitch and has the same direction. The internal thread as a whole can have any desired profile and can be made up of a number of threads which may be either greater or smaller than that of the screw-thread to be formed.

The sleeve 24 is driven in rotation in synchronism with the spindle 14 which carries the jaws: this synchronization is shown diagrammatically in FIG. 1 in the form of a simple connecting-rod 25. In point of fact, the actual device is of course much more complex and one example of construction will be described hereunder with reference to FIG. 2. A threaded workpiece-holding tube 26 is screwed into the sleeve 24, said tube being coupled to the workpiece 30 to be threaded by means of a friction coupling 28.

Assuming that the direction of the screw-thread to be formed corresponds to the direction of rotation of the jaws, provision is made for a braking mechanism 32 in order to exert on the threaded tube 26 a friction force whereby the movement of rotation of said tube may be braked or even arrested, said force being manually adjustable by means of a knurled nut 34 so that the friction jaws 35 can either be separated or moved closer together. Said braking mechanism for retarding rotational motion is intended to produce the axial motion of the workpiece 30 when this latter is not clamped by the hammer-block jaws 10 and is carried by a bracket 36 slidably mounted on a rod 38 which is parallel to the workpiece 30.

The operation of the device which has just been described will immediately be apparent: if the rotary swaging machine is set in motion without tightening the friction jaws 35, then the hammer-block jaws 10, the sleeve 24, the threaded tube 26 and the workpiece 30 rotate as a single unit. If the rotation of the workpiece 30 is retarded by means of the braking mechanism 32, the workpiece 30 advances towards the hammer-block jaws each time these latter open and release said workpiece. It is apparent that, each time the hammer-block jaws close and engage over the workpiece, said jaws are accompanied in their rotational motion by said workpiece which does not advance whereas the friction jaws of the braking mechanism 32 are permitted to slip. Each time the workpiece 30 is released by the hammer-block jaws 10, it moves forward and rotates at a speed which is determined essentially by the braking force exerted by the mechanism. By reason of the synchronization in rotation of the jaws 10 and of the sleeve 24 and the identity of pitch of the internal thread of the sleeve 24 with respect to the screw-thread to be formed, the workpiece 30 will always take up the correct position opposite to the jaws 10.

FIGS. 2 and 4 illustrate one mode of execution of the invention in which the general arrangement indicated in FIG. 1 is again adopted. For the sake of enhanced clarity, the components of FIGS. 2 and 4 which correspond to components already illustrated in FIG. 1 are designated by the same reference numerals.

There are again shown in FIGS. 2 and 3 jaws 10 carried by hammer-blocks 12 which are slidably mounted in the terminal annular portion of the driving spindle. The spindle is adapted to rotate within a freely-rotatable annular cage or separator ring 20 which carries the rollers 16. The separator ring 20 is carried by its rollers 16 which are adapted to run on the stationary outer ring 21. This arrangement is entirely conventional apart from the fact that the jaws are provided with the impression of the screw-thread to be formed on the workpiece 30.

The mechanism for advancing and positioning the workpiece 30 is carried by a support provided with a centering flange 42 which can be secured to the frame of the machine by means of bolts, only one of which is shown, namely the bolt 44. The thrust nose 45 of the machine which is maintained stationary and constitutes the fixed point is adapted to carry the internally threaded sleeve 24 by means of ball bearings 46 which retain said sleeve in translational motion along the axis. The workpiece 30 is also guided and carried by means of a threaded tube 26 to which it is attached by means of a friction coupling 28 which will be described hereinafter and the tube is screwed into the sleeve 24.

The mechanism which is shown in FIG. 2 for synchronizing the sleeve 24 and the annular portion of the spindle 14 in rotational motion comprises a pulley 48 which is coupled by means of a notched non-slip driving belt 50 to a pulley 52 which is keyed on a drive shaft 54 which can be provided with universal joints. Said shaft 54 is fitted with a second pulley 56 which is identical with the pulley 52, said second pulley being also coupled by means of a notched belt 58 to a pulley 59 having the same diameter as the pulley 48. The pulley 59 is integral with a bushing 60 and this latter is retained by means of ball-bearings 61 within a stationary sleeve 62 while being permitted to rotate freely. The bushing 60 is provided with a radial lug 64 which is slotted so as to permit the engagement of a pin 66 which is fixed to the spindle 14. Thus, the mechanism which is driven by the spindle 14 imparts an identical movement of rotation to the sleeve 24. In the embodiment which is illustrated in FIG. 2, the bushing 60 is additionally provided with a cone 67 for guiding the workpiece 30, thereby assisting the engagement of this latter within the hammer-block jaws 10.

It would clearly be feasible to adopt alternative synchronization mechanisms which employ, for example, gear systems consisting of pinions having suitable diameters. It is only necessary for this purpose to ensure that the sleeve 24 is driven by the hollow spindle 14 without play, at least in a constant direction of drive.

In order to ensure a tendency towards engagement of the workpiece within the jaws and of forward motion of said workpiece, it is necessary to subject the workpiece 30 to a movement of rotation with respect to the hammer-block jaws, that is to say to tend to endow the workpiece with a speed which is either higher or lower than that of the spindle, depending on the direction of the screw-thread to be formed.

The device which is shown in FIGS. 2 and 4 is provided for this purpose with a braking mechanism 32 which is similar to the mechanism shown diagrammatically in FIG. 1 and a mechanism for driving the workpiece in rotation. Said braking mechanism, which may be dispensed with if the driving mechanism is intended to operate in both directions, is made up of two friction jaws 35 carried by a bracket 36 which is capable of sliding on a rod 38. The friction force exerted is manually adjustable by means of the knurled knob 34 (as shown in FIG. 4) which produces action in opposition to elastic restoring means (not shown). The mechanism which tends to rotate the workpiece is constituted by a variable-speed motor 68 (as shown in FIG. 4) which is coupled by means of a torque limiter and driving belt 70 to a pulley 72 which is keyed on the threaded tube 26.

It is an advantage in some cases to form a screw-thread on a workpiece by carrying out a total swaging operation which results in elongation. This operation ensures that the stock is worked right through. The elongation referred-to does not affect the screw-thread inasmuch as it takes place only in that portion of the workpiece which has not yet passed between the hammer-block jaws. In order to absorb such elongation as may thus be produced, the device shown in FIG. 2 comprises a friction coupling 28 between the workpiece 30 and the threaded tube 26. Said coupling is intended to prevent the rotational motion of the workpiece 30 within the tube 26 in a positive manner but to set up only a high friction force in opposition to the axial sliding motion of the workpiece 30 and of the tube.

When the hammer-block jaws 10 close and rotate at the same time, the workpiece 30 which is temporarily made fast with said jaws both in rotational and axial motion is deformed by elongation towards the rear, that is to say towards the workpiece-holder tube 26 which is driven by the coupling 28 and rotates with said workpiece. At the same time, the coupling carries out a sliding movement and the ends of the tube 26 and of the workpiece 30 move towards each other whilst the friction jaws 35 (or the torque limiting coupling of the motor 68, as the case may be) are permitted to slip so as to absorb variations in speeds of rotation.

Among the alternative forms of application which also permit of satisfactory operation, one arrangement shown very diagrammatically in FIG. 5 is worthy of note. In this figure, the workpiece-holder tube 24' is locked rotationally by any suitable means which permit of free longitudinal displacement of the tube, said means being shown diagrammatically in the form of a sliding keyed connection between a coupling sleeve 74 which is secured to the terminal portion of the workpiece-holder tube 26' and a member 76 which is either stationary or designed to rotate at a predetermined speed. It is essential in this arrangement to ensure that the workpiece 30' is capable of moving both in rotation and in translation with respect to the tube 26' when it is driven by the hammer-block jaws 10 but is again locked with the tube 26' as soon as it is released by said jaws. In this instance, the workpiece 30' is mounted with strong friction within the sleeve which accordingly sets up in opposition to its rotational and axial movements only a friction force which is sufficient to ensure that the displacements of the workpiece-holder tube 26' are wholly imparted to the workpiece 30' outside those periods during which this latter is locked with the hammer-block jaws.

Under these conditions, during each period in which the jaws 10' are engaged over the workpiece 30' and drive this latter in rotation, the threaded workpiece-holder tube 26 moves forward with respect to the sleeve 24' which is also driven in rotation by the jaws. Thus, the coupling sleeve 74 which is secured against rotation advances along the workpiece 30 and this latter rotates within said sleeve 74 which is locked rotationally at the same speed as the hollow spindle which carries the hammer-block jaws 10'.

The solution which is presented in FIGS. 1 to 4 is generally found preferable to the variant which has just been described inasmuch as this latter is subject to one disadvantage: the coupling between the workpiece 30 and the threaded workpiece-holder tube must afford a sufficient length to be capable of absorbing not only the elongation of the workpiece which results from the swaging process but also the successive forward movements of the workpiece-holder tube as each closure of the jaws takes place, thereby resulting in increased dimensional requirements which may in some cases prove excessive.

The application of the method according to the invention in the devices described in the foregoing is very similar to the operation which was considered with reference to FIG. 1 and therefore calls for no extended description. It should merely be noted that the presence of the friction coupling 28 between the workpiece and the workpiece-holder permits the opposite ends of these latter to move towards each other and therefore permits complete swaging of the workpiece during the hammering operation.

It will be readily understood that the invention is suited for a wide range of applications. Thus, the screw-thread to be formed may consist of a simple rib with a coarse pitch. On condition that a smooth central mandrel is provided, thin tubular parts may accordingly be processed. By making use of a central mandrel having a coarse-pitch helical impression, it is possible to obtain a tube which is threaded both externally and internally.

I claim:

1. A method of forming screw-threads on the outer surfaces of cylindrical rods or tubes by means of hammer-block jaws provided with an impression of the screw-thread to be formed comprising the steps of rotating said jaws as a unit about an axis and simultaneously reciprocating said jaws radially towards and away from said axis, driving the first component of a two part coupling unit having first and second components and having a pitch equal to that of the screw-thread to be formed in rotation about said axis in synchronism with said hammer-block jaws, coupling the workpiece to be threaded to the second component of said coupling unit and subjecting said workpiece to a torque which tends to rotate it with respect to said hammer-block jaws.

2. A method in accordance with claim 1, the workpiece being frictionally coupled to the second component of the coupling unit for axial motion to permit elongation of said workpiece during closure of the hammer-block jaws, said workpiece being non-rotatably coupled with said second component, and said second component being yieldably forced in rotation with respect to said jaws and with respect to said first component.

3. A method in accordance with claim 1, said second component being subjected to a torque which tends to rotate it at a higher speed than said hammer-block jaws.

4. A method in accordance with claim 1, said second component being braked to cause rotation thereof at a lower speed than said hammer-block jaws.

5. A method in accordance with claim 1, said workpiece being frictionally coupled to said second component both in axial and rotational motion and said second component being secured against rotation and freely movable in axial motion.

6. A device for forming screw-threads on the outer surfaces of cylindrical rods or tubes, comprising a hammering machine, hammer-jaws for said machine which reproduce the impression of the screw-thread to be formed, means for imparting a radial reciprocating movement to said hammer-block jaws at a high frequency towards and away from an axis about which said jaws rotate as a unit, a sleeve rotating about said axis and secured against axial motion along said axis, means for synchronizing the rotation of said jaws with the rotation of said sleeve about said axis, a work-piece-holder providing with said sleeve a threaded connection having a pitch equal to and in the same direction as that of the screw-thread to be formed and means for subjecting said work-piece-holder to a force which tends to rotate it with respect to said sleeve and with respect to said hammer-block jaws.

7. A device in accordance with claim 6, said means for forcing said work-piece-holder in rotation with respect to said sleeve including friction jaws slidably mounted along an axis parallel to said workpiece and adjustment means for regulating the rotational-motion braking force exerted by said friction jaws on said work-piece-holder.

8. A device in accordance with claim 6, said driving means including a motor rotating the workpiece in the direction of rotation of said hammer-block jaws and a slippable torque-limiting coupling beween said motor and the workpiece.

9. A device in accordance with claim 7, said work-piece-holder being connected to the workpiece to be threaded by a yieldable coupling providing relative axial sliding motion of the workpiece when subjected to a predetermined torque.

10. A device in accordance with claim 9, the workpiece being non-rotatably connected to said work-piece-holder by said coupling.

11. A device in accordance with claim 6, said synchronization means including two drive systems comprising pulleys and notched belts having the same ratio interposed in one system between a member rotating with said hammer-block jaws and an intermediate drive shaft and in the other system between said drive shaft and said sleeve.

References Cited

UNITED STATES PATENTS

| | | | |
|---|---|---|---|
| 408,294 | 8/1889 | Dayton | 10—153 |
| 1,466,302 | 8/1923 | Jouve | 10—153 |
| 1,858,733 | 5/1932 | Flachbart | 10—153 |
| 2,702,393 | 2/1955 | Merton | 10—105 |
| 2,733,458 | 2/1956 | Trurnit | 10—153 |
| 2,862,215 | 12/1958 | Gross | 10—153 |
| 2,976,549 | 3/1961 | Burd | 10—153 |

CHARLES W. LANHAM, Primary Examiner

E. M. COMBS, Assistant Examiner